(12) United States Patent
Dalsgaard et al.

(10) Patent No.: US 8,958,357 B2
(45) Date of Patent: Feb. 17, 2015

(54) METHOD AND APPARATUS FOR FACILITATING RELAY NODE COMMUNICATIONS

(75) Inventors: Lars Dalsgaard, Oulu (FI); Lei Du, Beijing (CN); Benoist Pierre Sebire, Tokyo (FR)

(73) Assignee: Nokia Corporation, Espoo (FI)

( * ) Notice: Subject to any disclaimer, the term of this patent is extended or adjusted under 35 U.S.C. 154(b) by 185 days.

(21) Appl. No.: 13/377,823

(22) PCT Filed: Jun. 9, 2010

(86) PCT No.: PCT/FI2010/050477
§ 371 (c)(1),
(2), (4) Date: Dec. 12, 2011

(87) PCT Pub. No.: WO2010/142852
PCT Pub. Date: Dec. 16, 2010

(65) Prior Publication Data
US 2012/0082088 A1 Apr. 5, 2012

Related U.S. Application Data

(60) Provisional application No. 61/186,563, filed on Jun. 12, 2009.

(51) Int. Cl.
*H04B 7/14* (2006.01)
*H04J 1/10* (2006.01)
(Continued)

(52) U.S. Cl.
CPC ....... *H04W 74/0875* (2013.01); *H04L 12/4625* (2013.01)
USPC ............................. 370/315; 370/492; 370/501

(58) Field of Classification Search
CPC .................................................. H04W 74/0875

USPC .......................................................... 370/315
See application file for complete search history.

(56) References Cited

U.S. PATENT DOCUMENTS

2002/0154653 A1* 10/2002 Benveniste .................. 370/447
2005/0083843 A1 4/2005 Pinault
(Continued)

FOREIGN PATENT DOCUMENTS

| CN | 1943169 A | 4/2007 |
| CN | 101374284 A | 2/2009 |
| EP | 1349321 A2 | 10/2003 |

OTHER PUBLICATIONS

International Search Report and Written Opinion of the International Searching Authority for PCT/FI2010/050477 dated Oct. 1, 2010, 14 pages.

(Continued)

*Primary Examiner* — Derrick Ferris
*Assistant Examiner* — Joe Combs
(74) *Attorney, Agent, or Firm* — Mintz Levin Cohn Ferris Glovsky and Popeo, P.C.

(57) ABSTRACT

Various methods for providing relay node priority are provided. One example method includes generating a relay node access message for initiating an access procedure to establish a connection between a relay node and a donor cell. The relay node access message may be generated in accordance with an access priority scheme. The access priority scheme may be defined such that a higher priority is allocated to the relay node access message than a user device access message for initiating the access procedure to establish a direct connection between the user device and the donor cell. The example method may also include providing for transmission of the relay node access message in accordance with the access priority scheme. Similar and related example methods and example apparatuses are also provided.

20 Claims, 15 Drawing Sheets

(51) Int. Cl.
*H04W 74/08* (2009.01)
*H04L 12/46* (2006.01)

(56) References Cited

U.S. PATENT DOCUMENTS

| | | | |
|---|---|---|---|
| 2007/0127378 A1 | 6/2007 | Yang et al. | |
| 2007/0201427 A1 | 8/2007 | Lee et al. | |
| 2008/0043710 A1* | 2/2008 | Zhou et al. | 370/348 |
| 2008/0043712 A1* | 2/2008 | Hart et al. | 370/348 |
| 2008/0107073 A1* | 5/2008 | Hart et al. | 370/330 |
| 2008/0107078 A1* | 5/2008 | Viorel et al. | 370/331 |
| 2008/0159217 A1* | 7/2008 | Chang et al. | 370/329 |
| 2008/0165748 A1* | 7/2008 | Visotsky et al. | 370/338 |
| 2008/0219229 A1* | 9/2008 | Zheng | 370/338 |
| 2008/0227386 A1* | 9/2008 | Dayal et al. | 455/7 |
| 2009/0075587 A1* | 3/2009 | Yu et al. | 455/7 |
| 2009/0147706 A1* | 6/2009 | Yu et al. | 370/277 |
| 2009/0168705 A1* | 7/2009 | Kim et al. | 370/329 |
| 2009/0228598 A1* | 9/2009 | Stamoulis et al. | 709/230 |
| 2009/0247072 A1* | 10/2009 | Nakamura | 455/11.1 |
| 2009/0303895 A1* | 12/2009 | Zhang et al. | 370/252 |
| 2009/0303918 A1* | 12/2009 | Ma et al. | 370/315 |
| 2010/0002582 A1* | 1/2010 | Luft et al. | 370/230.1 |
| 2010/0113051 A1 | 5/2010 | Du et al. | |
| 2010/0150103 A1* | 6/2010 | Womack et al. | 370/331 |
| 2010/0167743 A1* | 7/2010 | Palanki et al. | 455/436 |
| 2011/0026409 A1* | 2/2011 | Hu et al. | 370/243 |
| 2011/0235609 A1* | 9/2011 | Ahn et al. | 370/329 |

OTHER PUBLICATIONS

3GPP TS 36.331 V8.5.0 (Mar. 2009) Technical Specification 3rd Generation Partnership Project;Technical Specification Group Radio Access Network; Evolved Universal Terrestrial Radio Access (E-UTRA) Radio Resource Control (RRC); Protocol specification (Release 8).

3GPP TR 36.913 V8.0.0 (Jun. 2008) Technical Report 3rd Generation Partnership Project; Technical Specification Group Radio Access Network; Requirements for Further Advancements for E-UTRA (LTE-Advanced) (Release 8).

3GPP TR 36.814 V0.4.1(Feb. 2009) Technical Report3rd Generation Partnership Project;Technical Specification Group Radio Access Network;Further Advancements for E-UTRA Physical Layer Aspects (Release 9).

3GPP TS 36.300 V8.7.0 (Dec. 2008) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

3GPP TS 36.321 V8.5.0 (Mar. 2009) Technical Specification 3rd Generation Partnership Project; Technical Specification Group Radio Access Network; Evolved Universal Terrestrial Radio Access (E-UTRA) Medium Access Control (MAC) protocol specification (Release 8).

* cited by examiner

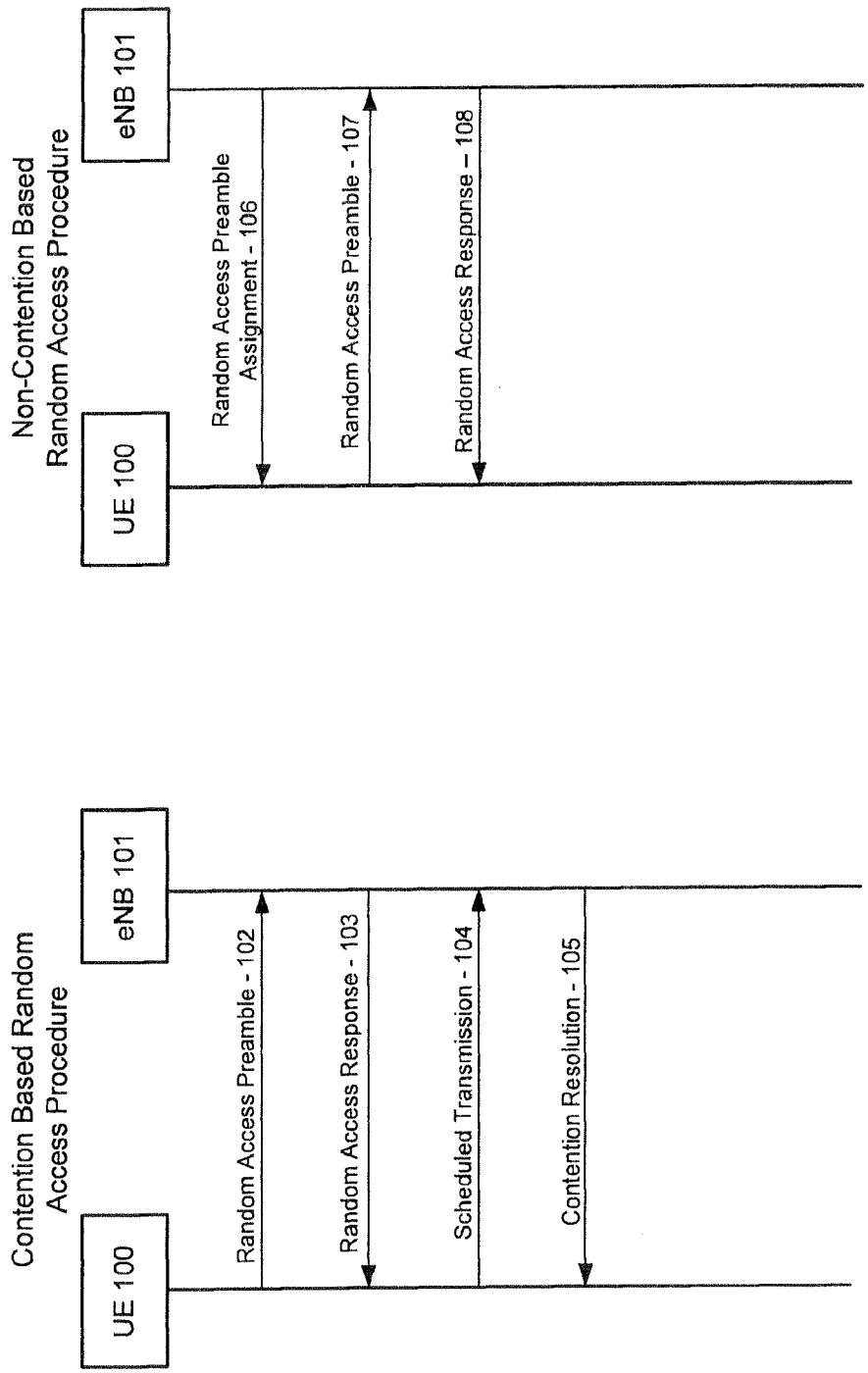

```
RACH-ConfigCommon ::=      SEQUENCE {
    preambleInfo              SEQUENCE {
        numberOfRA-Preambles      ENUMERATED {
                                      n4, n8, n12, n16 ,n20, n24, n28,
                                      n32, n36, n40, n44, n48, n52, n56,
                                      n60, n64},
        preamblesGroupAConfig     SEQUENCE {
            sizeOfRA-PreamblesGroupA  ENUMERATED {
                                          n4, n8, n12, n16 ,n20, n24, n28,
                                          n32, n36, n40, n44, n48, n52, n56,
                                          n60},
            messageSizeGroupA         ENUMERATED {b56, b144, b208, b256},
            messagePowerOffsetGroupB  ENUMERATED {
                                          minusinfinity, dB0, dB5, dB8, dB10, dB12,
                                          dB15, dB18},
            ...
        }                         OPTIONAL                              -- Need OP
    },
```

FIG.2a

```
-- ASN1START

PRACH-ConfigSIB ::=       SEQUENCE {
    rootSequenceIndex         INTEGER (0..837),
    prach-ConfigInfo          PRACH-ConfigInfo                          OPTIONAL    -- Need ON
}

PRACH-Config ::=          SEQUENCE {
    rootSequenceIndex         INTEGER (0..837),
    prach-ConfigInfo          PRACH-ConfigInfo
}

PRACH-ConfigInfo ::=      SEQUENCE {
    prach-ConfigIndex         INTEGER (0..63),
    highSpeedFlag             BOOLEAN,
    zeroCorrelationZoneConfig INTEGER (0..15),
    prach-FreqOffset          INTEGER (0..94)
}

-- ASN1STOP
```

FIG.2b

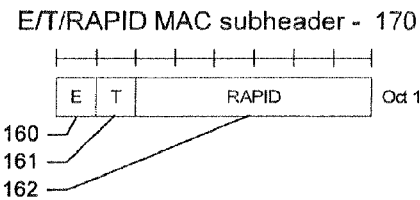
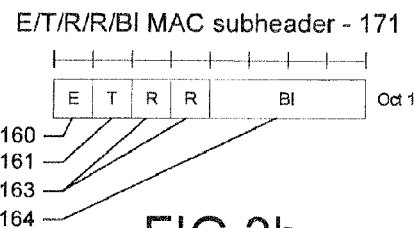
FIG.3a
FIG.3b
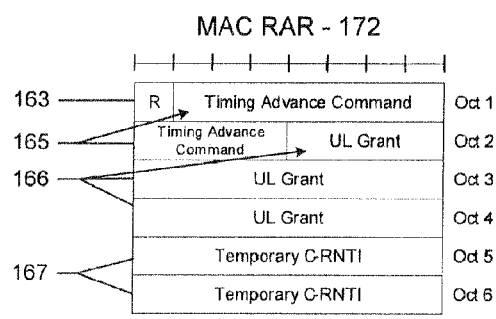
FIG.3c
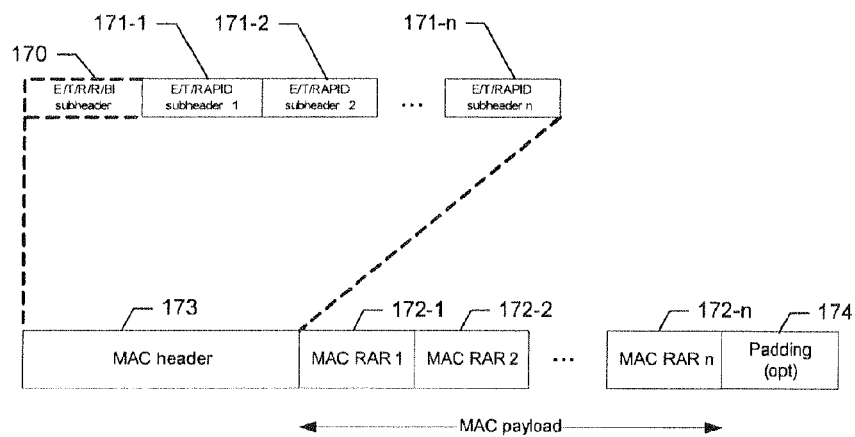
FIG.3d

```
-- ASN1START

RACH-ConfigDedicated ::=      SEQUENCE (
    ra-PreambleIndex              INTEGER (0..63),
    ra-PRACH-MaskIndex            INTEGER (0..15)
}

-- ASN1STOP
```

FIG.4

```
RN-RACH-ConfigCommon ::=     SEQUENCE {
    RN-preambleInfo              SEQUENCE {
        RN-numberOfRA-Preambles      ENUMERATED {
                                     n4, n8, n12, n16 ,n20, n24, n28,
                                     n32, n36, n40, n44, n48, n52, n56,
                                     n60, n64},
        startRNpreambleindex         ENUMERATED {
                                     n4, n8, n12, n16 ,n20, n24, n28,
                                     n32, n36, n40, n44, n48, n52, n56,
                                     n60, n64},
        ...
    },                                                             -- Need OP
    }       OPTIONAL
```

FIG. 7

METHOD AND APPARATUS FOR FACILITATING RELAY NODE COMMUNICATIONS

RELATED APPLICATION

This application was originally filed as PCT Application No. PCT/FI20101050477 filed Jun. 9, 2010, which claims priority benefit to U.S. Provisional Patent Application No. 61/186,563, filed Jun. 12, 2009.

TECHNICAL FIELD

Embodiments of the present invention relate generally to mechanisms that support wireless communications, and, more particularly, relate to a method and apparatus for establishing a connection, such as a connection via a backhaul link of a relay node.

BACKGROUND

The modern communications era has brought about a tremendous expansion of wireless networks. Various types of networking technologies have been developed resulting in an unprecedented expansion of computing networks, telephony networks, and the like, fueled by consumer demand. Wireless and mobile networking technologies have addressed related consumer demands, while providing more flexibility and immediacy of information transfer.

As users become increasingly dependant upon wireless networks for business and personal needs, the desire for faster and more widely accessible wireless communications increases. In some instances, wireless networks may employ various techniques, such as hardware or software solutions, to increase the bandwidth and transfer rates, and the quality of service.

Some wireless networks can be increasingly susceptible to degraded performance under particular conditions. For example, a wireless network that employs a relay node to support communications between user equipment (UE), also referred to as a user device (e.g., a mobile terminal), and a donor cell (e.g., base station) can be susceptible to degraded performance when issues arise with respect to the communications link between the relay node and the donor cell, which, in some instances, may be referred to as the backhaul link. The relay node may be supporting communications connections between any number of UEs and may need to compete for the resources of the donor cell with a UE that is attempting to directly connect with the donor cell (not via the relay node). In this and other instances, the overall quality of service of the system may be diminished, if the connection between the relay node and the donor cell is negatively impacted.

BRIEF SUMMARY

Methods and apparatuses are described that provide connection priority to relay nodes via various mechanisms, for example, when a relay node is attempting to make a random access (RA) connection with a donor cell via a backhaul link. In accordance with some example embodiments, one or more dedicated message preambles may be allocated to relay nodes to facilitate a donor cell distinguishing between a relay node and a UE attempting to connect to the donor cell. Alternatively, according to some example embodiments, particular resources, such as Physical Random Access Channel (PRACH) resources, Packet Uplink Shared Channel (PUSCH) or Packet Uplink Control Channel (PUCCH) resources, may be allocated for use by one or more relay nodes, to the exclusion of use by UEs attempting to directly connect to a donor cell to distinguish between communications from a relay node and communications from a UE. In example embodiments where more than one relay node is implemented, and the relay nodes connect to the same donor cell, utilization of the resources may be scheduled amongst the relay nodes. Alternatively, according to some example embodiments, backoff time periods implemented after a message collision may be shorter for relay nodes relative to backoff time periods for UEs, thereby increasing the likelihood that a relay node will establish a connection to a donor cell. Alternatively, according to some example embodiments, a relay node may be configured to use contention-based random access procedures for a first access to a donor cell, and use non-contention based random accessing procedures subsequently based on an assigned access preamble during the first access. In yet another alternative, according to some example embodiments, relay nodes may use a higher transmission power when transmitting access preambles, relative to the transmission power used by UEs establishing a connection to the same donor cell.

According to various example embodiments, priority access schemes for relay nodes, as described above and generally herein, enable reliable connection establishment between relay nodes and donor cells. Further, example embodiments expedite random access procedures over the backhaul link, once a UE succeeds in the random access procedure over the access link. Additionally, example embodiments alleviate the negative impact to multiple UEs accessing one relay node.

Although the example embodiments described above and generally herein may be described separately, one of skill in the art would appreciate that combinations of the example embodiments are also contemplated. For example, in accordance with an example embodiment, a higher transmission power for access preambles may be employed together with shorter backoff delay periods for relay nodes.

Various example embodiments of the present invention are described herein. One example embodiment is a method for providing relay node priority. The example method includes generating a relay node access message for initiating an access procedure to establish a connection between a relay node and a donor cell. The relay node access message may be generated in accordance with an access priority scheme, and the access priority scheme may be defined such that a higher priority is allocated to the relay node access message than a user device access message for initiating the access procedure to establish a direct connection between the user device and the donor cell. The example method may further comprise providing for transmission of the relay node access message in accordance with the access priority scheme.

Another example embodiment is an example apparatus for providing relay node priority. The example apparatus comprises at least one processor and at least one memory including computer program code. The at least one memory and the computer program code may be configured to, with the at least one processor, cause or direct the example apparatus to perform various functionality. In this regard, the example apparatus may be directed to perform generating a relay node access message for initiating an access procedure to establish a connection between a relay node and a donor cell. The relay node access message may be generated in accordance with an access priority scheme, and the access priority scheme may be defined such that a higher priority is allocated to the relay node access message than a user device access message for initiating the access procedure to establish a direct connection between the user device and the donor cell. The example apparatus may be further directed to perform providing for transmission of the relay node access message in accordance with the access priority scheme.

Another example embodiment is an example computer program product for providing relay node priority. The example computer program product comprises at least one computer-readable storage medium (e.g., a memory) having executable computer-readable program code instructions stored therein. The program code of the example computer program product may be configured to direct an apparatus to perform various functionalities upon execution. In this regard, the program code may be configured to direct an apparatus to perform generating a relay node access message for initiating an access procedure to establish a connection between a relay node and a donor cell. The relay node access message may be generated in accordance with an access priority scheme, and the access priority scheme may be defined such that a higher priority is allocated to the relay node access message than a user device access message for initiating the access procedure to establish a direct connection between the user device and the donor cell. The program code may also be configured to direct the apparatus to perform providing for transmission of the relay node access message in accordance with the access priority scheme.

Another example embodiment is an apparatus for providing relay node priority. The example apparatus includes means for generating a relay node access message to initiate an access procedure to establish a connection between a relay node and a donor cell. The relay node access message may be generated in accordance with an access priority scheme, and the access priority scheme may be defined such that a higher priority is allocated to the relay node access message than a user device access message for initiating the access procedure to establish a direct connection between the user device and the donor cell. The example apparatus may also include means for providing for transmission of the relay node access message in accordance with the access priority scheme.

Yet another example embodiment is another method for providing relay node priority. The example method includes receiving an access message for initiating an access procedure to establish a connection to a donor cell, and determining, based on an access priority scheme, that the access message is an access message generated by a relay node in accordance with the access priority scheme. The example method may further include, in response to determining that the access message is an access message generated by a relay node in accordance with the access priority scheme, prioritizing establishment of a connection between the relay node and the donor cell ahead of establishment of a connection between a user device and the donor cell.

Another example embodiment is an example apparatus for providing relay node priority. The example apparatus comprises at least one processor and at least one memory including computer program code. The at least one memory and the computer program code may be configured to, with the at least one processor, cause the example apparatus to perform various functionality. In this regard, the example apparatus may be caused to perform receiving an access message for initiating an access procedure to establish a connection to a donor cell and determining, based on an access priority scheme, that the access message is an access message generated by a relay node in accordance with the access priority scheme. The example apparatus may be further caused to perform, in response to determining that the access message is an access message generated by a relay node in accordance with the access priority scheme, prioritizing establishment of a connection between the relay node and the donor cell ahead of establishment of a connection between a user device and the donor cell.

Another example embodiment is an example computer program product for providing relay node priority. The example computer program product comprises at least one computer-readable storage medium (e.g., memory) having executable computer-readable program code instructions stored therein. The program code may be configured to direct an apparatus to perform various functionalities upon execution. In this regard, the program code may be configured to direct the apparatus to perform receiving an access message for initiating an access procedure to establish a connection to a donor cell and determining, based on an access priority scheme, that the access message is an access message generated by a relay node in accordance with the access priority scheme. The program code may also be configured to direct the apparatus to perform, in response to determining that the access message is an access message generated by a relay node in accordance with the access priority scheme, prioritizing establishment of a connection between the relay node and the donor cell ahead of establishment of a connection between a user device and the donor cell.

Another example embodiment is an apparatus for providing relay node priority. The example apparatus includes means for receiving an access message for initiating an access procedure to establish a connection to a donor cell, and means for determining, based on an access priority scheme, that the access message is an access message generated by a relay node in accordance with the access priority scheme. The example apparatus may further include, in response to determining that the access message is an access message generated by a relay node in accordance with the access priority scheme, means for prioritizing establishment of a connection between the relay node and the donor cell ahead of establishment of a connection between a user device and the donor cell.

BRIEF DESCRIPTION OF THE DRAWING(S)

Having thus described the invention in general terms, reference will now be made to the accompanying drawings, which are not necessarily drawn to scale, and wherein:

FIG. 1a illustrates a contention based random access procedure according to various example embodiments of the present invention;

FIG. 1b illustrates a non-contention based random access procedure according to various example embodiments of the present invention;

FIG. 2a illustrates the inclusion of preamble information in a message according to various example embodiments of the present invention;

FIG. 2b illustrates the inclusion of preamble information in another message according to various example embodiments of the present invention;

FIGS. 3a-3d illustrate a media access control data unit for transmitting a random access response according to various example embodiments of the present invention:

FIG. 4 illustrates dedicated random access parameters according to various example embodiments of the present invention;

FIG. 7 illustrates an example message employing a relay node dedicated preamble access priority scheme according to various example embodiments of the present invention;

DETAILED DESCRIPTION

Figure 5:
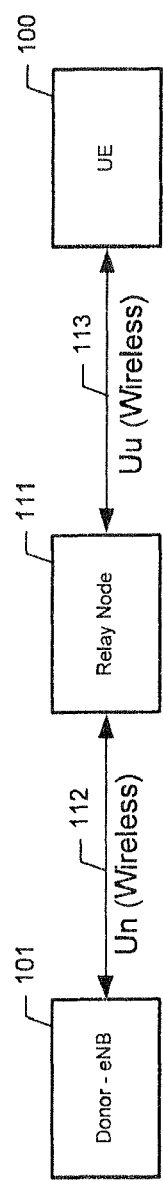
FIG. 5 illustrates a block diagram of an example relay system according to various example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As further described herein, various example embodiments of the present invention provide access priority to a relay node. Access priority may be provided in accordance with any number of message and session establishment techniques. In some example embodiments, random access (RA) procedures in Long Term Evolution (LTE) systems for establishing a connection via a backhaul link and the Un interface (further described below) between a relay node and a donor cell may be involved in implementing relay node access priority. While example embodiments of the present invention are described within the context of a relay node establishing a connection via a backhaul link with a donor cell, it is contemplated that various example embodiments of the present invention may be applicable to the establishment of links between relay nodes and donor cells on a general level.

As further described below, relay nodes may serve a plurality of UEs via a backhaul link to a donor cell. The donor cell may be a cell of an enhanced Node B (eNB) configured to not only support communications with the relay node via the backhaul link, but also support direct communication connections with UEs. As such, a UE attempting to directly connect or otherwise communicate with the donor cell may be in competition with a relay node for resources and treatment. Since the relay node may support network communications involving multiple UEs, while a direct connect UE implicates the communications of likely a single UE, priority treatment may be allocated to relay nodes. Via the implementation of priority treatment of relay nodes, overall network quality of service may be improved.

According to some example embodiments of the present invention, random access (RA) procedures may be implicated. RA may begin a procedure for establishing a connection between two nodes on a wireless communications system. In this regard, RA may include or otherwise be associated with connection establishment and the assigning or requesting of resources, which may be accomplished in several ways depending on the configuration of the system and, more specific parameters, such as the status of UE uplink timing advances. For downlink (DL) resource assignment, scheduling via the Physical Downlink Control Channel (PDCCH) may be utilized, if the assigned entity has a valid uplink timing advance value. In the alternative, an entity may be requested to transmit an RA preamble through the use of a PDCCH order. With respect to requesting resources from an eNB, such as an eNB donor cell, a Random Access Channel (RACH) procedure may be utilized, for example, if the requesting entity does not have valid uplink (UL) timing advance. Further, a transmission of a scheduling request (SR) on the Packet Uplink Control Channel (PUCCH) may also be utilized, if allocated, or if requesting entity has valid UL timing advance.

If an RA procedure is utilized, the RA procedure may be implemented in response to one or more events as described in "Evolved Universal Terrestrial Radio Access (E-UTRA) and Evolved Universal Terrestrial Radio Access Network (E-UTRAN); Overall description; Stage 2," 3GPP TS 36.300 v8.7.0 and "Evolved Universal Terrestrial Radio Access (E-UTRA); Medium Access Control (MAC) Protocol Specification," 3GPP TS 36.321 v8.5.0, which are herein incorporated by reference in their entirety. The events may include an initial access by an entity from an idle state, such as an RRC_IDLE state; an initial access after radio link failure; a handover requiring a random access procedure; a DL data arrival during a connected state, such as an RRC_CONNECTED state, requiring an RA procedure (e.g., when a DL synchronization status indicates that the entities are not synchronized); a UL data arrival during a connected state, such as RRC_CONNECTED state, requiring an RA procedure (e.g., when a UL synchronization status indicates that the entities are not synchronized); or when no PUCCH resources for SRs are available.

An RA procedure may take two forms, namely contention based and non-contention based. A contention based random access procedure involves the selection (e.g., a random selection) of a preamble from an allotted group of preambles for use in a RA procedure. Multiple entities may be selecting from the same group of preambles, and as such conflicts may occur when two entities select the same preamble. In some instances, the group of preambles may be divided into, for example, group A and group B. In this regard, the preambles identified as preamble 0 through preamble (size of the RA preamble group)—1 may be allocated to Group A, and the remaining preambles may be allocated to group B.

FIG. 1*a* illustrates an example scenario involving a contention based random access procedure between a UE 100 and an eNB 101. At 102, the UE 100 randomly selects an RA preamble and transmits the preamble in a configured or selected Physical Random Access Channel (PRACH). A message that transmits the preamble may be referred to as message 1. The preamble may be included in a system information portion of a message, such as an IE RACH-ConfigCommon message portion, as depicted in FIG. 2*a*. The PRACH resources available for use by the UE 100 for transmission of the RA preamble may be included in a PRACH-ConfigurationIndex of the IE PRACH-Config as indicated in FIG. 2*b*.

Referring again to FIG. 1*a*, at 103, eNB 100 detects the RA preamble selected by the UE 100, and replies with an RA response (RAR) including the detected preamble index identified by the Random Access Preamble Identifier (RAPID), a temporary Cell-Radio Network Temporary Identifier (C-RNTI), the timing advance, and the UL grant for a subsequent scheduled transmission. An RAR may be referred to as message 2 within a random access procedure. The Media Access Control Packet Data Unit (MAC PDU) for transmitting the RAR is depicted in FIG. 3*d*, and FIGS. 3*a* through 3*c* depict portions of the Media Access Control (MAC) header and RAR message. If the UE 100 successfully detects reception of the RAR at 103, a scheduled transmission may be provided at 104 from the UE 100 to the eNB 101 in response to the RAR. The scheduled transmission at 104 may be referred to as message 3 (msg3) within the RA procedure. The eNB 101 may then resolve any contention and/or notify the UE 100 at 105.

The MAC PDU depicted in FIG. 3*d* includes a MAC header 173, one or more MAC RARs 172 (e.g., 172-1, 172-2, and 172-*n*), and optional padding 174. The MAC header 173 includes one or more MAC PDU subheaders 171 (e.g., 171-1, 171-2, and 171-*n*) corresponding to associated MAC RARs, and a Backoff Indicator (BI) subheader 170. FIG. 3*a* depicts the format of a MAC PDU subheader 170, which may include three fields indicated by an E field 160, a T field 161, and a RAPID field 162. The E field 160 is an extension field flag that indicates whether or not another subheader follows the current subheader. The T field 161 is a type field flag that indicates whether the current MAC subheader includes a RAPID or a BI. As indicated above the RAPID field 162 indicates the preamble used for RA. The MAC PDU subheader 170 is octet aligned.

FIG. 3*b* depicts the format of a BI subheader 171. The BI subheader includes five fields. The E field 160 and T field 161 operate as described above. The R fields 161 are reserved fields that may be set to a constant value. The BI field 164 may include a value indicative of, or a value that may be used to determine the duration of, a backoff delay or period to be implemented after a failure to successfully receive a RAR. In some instances, a BI subheader 170 may be common to and used by all UEs. In this regard, if no RAR is received by the UE 100 within the RAR response window, if none of all received RARs contain a RAPID corresponding to the transmitted RA preamble (possibly because of a conflict with another UE selecting the same preamble or a collision), or if receipt of the RAR otherwise fails, the UE 100 may implement a backoff period and delay the subsequent RA retransmission by the backoff period calculated or determined based on the BI. The BI subheader 171 is octet aligned.

FIG. 3*c* depicts the format of a MAC RAR 172. A MAC RAR may include five fields. The R field 163 is a reserved field as described above. The Timing Advance Command field 165 may indicate to a UE the value that that the UE should use for timing adjustment. The UL grant field 166 indicates the resources to be on the uplink. Further, the Temporary C-RNTI field 167 indicates the temporary identity for a UE during RA. The MAC RAR 172 is octet aligned.

FIG. 1*b* depicts a non-contention based scenario involving a UE 100 and an eNB 101. Non-contention based RA procedures may be applicable to handover and DL data arrival situations. In a non-contention based RA procedure the eNB 101 assigns a preamble to the UE 100 at 106. The assigned preamble is unique and dedicated to the UE 100, for example, for use during a handover. Since the preamble is unique and dedicated for use by only one UE, reliable access to the eNB 101 by the UE 100 is facilitated. The UE 100 may then perform the RA procedure using the assigned preamble at 107. Dedicated RA parameters for IE RACH-ConfigDedicated information elements are depicted in FIG. 4. Subsequent to providing the RA preamble at 107, eNB 101 may provide a RAR to the UE 100 at 108. In response to the RAR, the UE 100 may, but need not in some circumstances (e.g. a handover), transmit a scheduled transmission or message 3 to the eNB 101 (not depicted).

In view of the forgoing description of the RA procedures, some example embodiments of the present invention may be further described within the context of a wireless network implementing a relay node. FIG. 5 depicts an example system employing an eNB 101 as the donor cell (also referred to as donor cell 101), a relay node 111, and a UE 100 connected to the wireless network through the donor cell 101 via the relay node 111. While the donor cell referred to herein is described with respect to an eNB, it is contemplated that the donor cell may be any type of access point.

The interface between UE 100 and the relay node may be referred to as the Uu interface and the associated link may be referred to as the access link 113. According to some example embodiments, the Uu interface may be compatible with legacy UEs, such as UEs implementing the Release 8 interface as defined in LTE. The interface between the relay node and the donor cell may be referred to as the Un interface, and the associated link may be referred to as the backhaul link 112.

While the donor cell 101 may establish a backhaul link 112 with the relay node 111, the donor cell 101 may also establish direct links to UEs, that is, links to UEs that are not via a relay node. As briefly described above, direct link UEs may compete with relay nodes for the resources of the donor cell. In this regard, the RA procedures described above may be used for both relay nodes and direct link UEs to establish connections. Assuming contention based RA, the relay node 111 would compete with the direct link UEs for resources on, for example, the PRACH on an equal footing and experience the same access performance.

However, access for the relay node 111 over backhaul link 112 may be considered more important than access for a single UE. For example, an RA from a relay node 111 to donor cell 101 may be initiated after the UE 100 succeeds in the RA procedure over access link 113. If the relay node 111 fails to establish a connection via the backhaul link 112, the efforts expended by UE 100 to establish the access link 113 may be wasted. Moreover, an RA retry attempt to establish a connection via the backhaul link 112 may increase the access time period, and also result in reduced quality of service to the UE 100, particularly if repeated failures to establish a connection via the backhaul link 112 fail.

Further, the traffic load through the relay node 111 following the success of RA and the establishment of a connection via the backhaul link 112 may be substantially more than the traffic associated with a direct link UE competing for the same resources. In this regard, failure to establish a connection to a direct link UE often impacts a single UE, while failure of a relay node to establish a connection via the backhaul link may impact multiple UEs connected via the relay node.

Additionally, in some instances the relay node 111 may support Hybrid Automatic Repeat Request (HARQ) feedback and retransmission over access link 113. In this regard the UE 100 may provide data to the relay node 111 prior to establishing a connection via the backhaul link 112. An RA failure over the backhaul link 112 may then increase the delay in transmitting the data buffered at the relay node, and may result in packets being dropped at the relay node 111 due to expiration of the buffered data.

As a result, according to various example embodiments, providing priority to the relay node 111 overcomes, or at least lessens, the impacts of resource competition between UEs and relay nodes. Providing priority to the relay node 111 may prove particularly useful when the relay node 111 is a mobile device that may need to reconnect to various donor cells due, for example, to movement of the relay node.

Various access priority schemes, and combinations of access priority schemes, may be implemented to provide the priority to the relay node in accordance with various example embodiments of the present invention. In one access priority scheme, an exclusive group of dedicated preambles may be made available only to relay nodes for selection and use in access messaging. For example, contention based RA may allow for sixty-four preambles to be selected from to initiate a contention based RA procedure. The sixty-four preambles may be divided into two groups. One group may be used exclusively by relay nodes for access messaging. In accordance with some example embodiments, a relay node may be configured to use any preamble, even those not exclusively allocated to the relay nodes, while UEs may only use preambles not allocated the exclusive relay node group.

Figure 6:
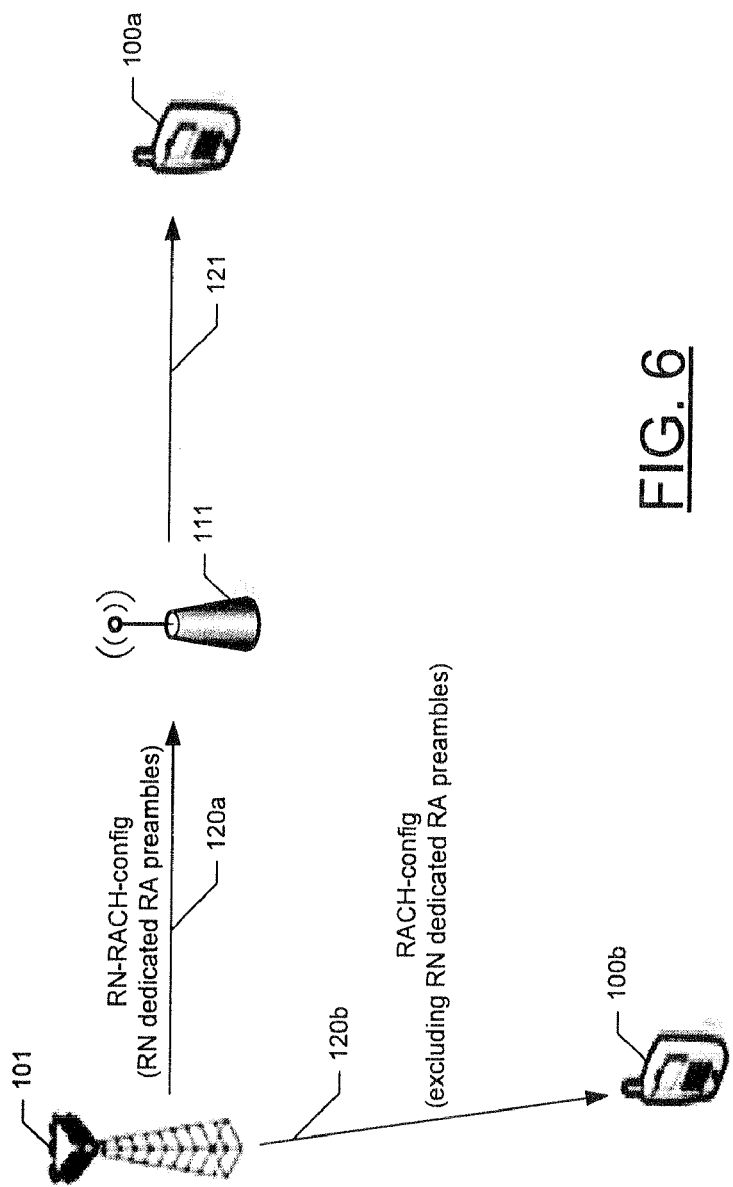
FIG. 6 illustrates an example relay system employing a relay node dedicated preamble access priority scheme according to various example embodiments of the present invention.

According to various example embodiments, information regarding the exclusive relay node preamble group may be advertised by the donor cell via system information messaging to both UEs and relay nodes within range. For example, according to some example embodiments, system information messaging may be defined as provided in "Evolved Universal Terrestrial Radio Access (E-UTRA); Radio Resource Control (RRC); Protocol Specification," 3GPP TS 36.331 v8.5.0. In some example embodiments, for overhead reduction and backward compatibility, the information may be encoded in the system information such that legacy Release 8 UEs would ignore and/or discard the information, while the RACH-config messaging available to such UEs would preclude the exclusive group of preambles dedicated to the relay nodes, as depicted in FIG. 6. In this manner collisions can be reduced.

Referring to FIG. 6, the donor cell 101 may advertise, for example via a broadcast message or separate messages 120*a* and 120*b*, the exclusive group of preambles allocated to the relay nodes. A RN-RACH-config message 120*a* that includes the relay node dedicated RA preambles may be received by the relay node 111. If a broadcast implementation is used, a RACH-config message 120*b*, which may be the same message as 120*a*, may be provided to the UE 100*b*. The RACH-config message 120*b* may include the preambles that may be used by the UEs, including the UE 100*b*, which may be a legacy Release 8 UE. UE 100*b* may be a UE that attempts to establish a direct link with the donor cell 101, and therefore may compete for resources with the relay node 111. The UE 100*a* may also receive a config message 121, such as a RACH config message or a PRACH config message, including the preambles available for use by UEs. Further, an example IE RN-RACH-configCommon message that may be advertised by the donor cell 101 for this purpose is depicted in FIG. 7. Referring to FIG. 7, the exclusive group of relay node preambles may be identified via the number of RA preambles dedicated for RNs (RN-numberofRA-Preambles) and the index of the start preamble (startRNpreambleindex). In this regard, when the relay node 111 performs an RA procedure, the relay node may select, for example randomly or pseudo-randomly, one of the preambles from the identified group. To guarantee that these preambles are dedicated for relay nodes, the set of RA preambles configured for UEs may be modified correspondingly. For example, the number of preambles available for use by UEs may be the total number of preambles minus the number of preambles exclusively allocated for use by the relay nodes.

Figure 8:
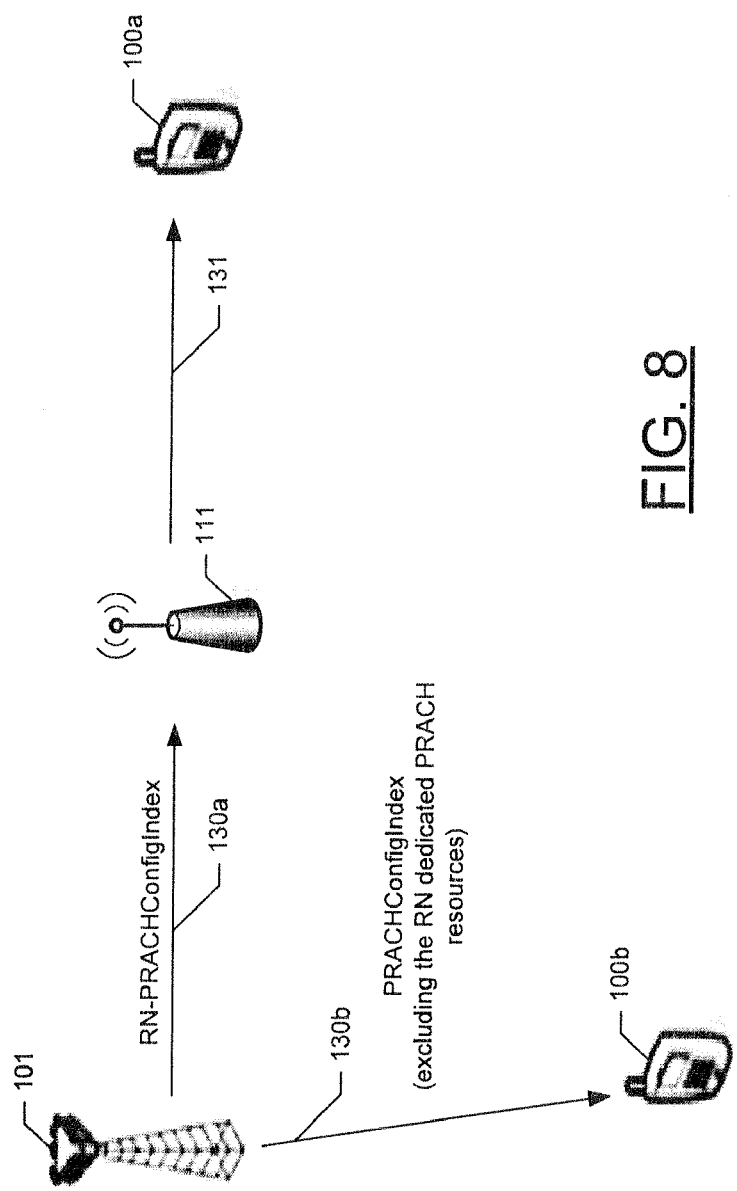
FIG. 8 illustrates an example relay system employing a relay node dedicated resources access priority scheme according to various example embodiments of the present invention.

Another access priority scheme for providing priority to relay nodes may involve dedicating predefined resources to relay nodes. In this regard, the donor cell 101 may restrict the RA preamble transmission initiated by relay nodes to specific PRACH resources. This scheme is similar to the scheme described above, except that a group of resources are for exclusive use by the relay nodes. As shown in FIG. 8, resource exclusion may be achieved, for example, via the PRACHconfigIndex messaging. The PRACHConfigIndex messaging may define an RN-dedicated PRACH resource dedicated for relay nodes. Again, for overhead reduction and backward compatibility, information regarding the resources allocated to the relay nodes may be encoded such that legacy Release 8 UEs would ignore and/or discard the information. With reference to FIG. 8, the donor cell 101 provides a RN-PRACH-ConfigIndex 130*a* message to the relay node 111, possibly via broadcast. The donor cell 101 also provides, possibly via the same broadcast, a PRACHConfigIndex message 130*b* that excludes the relay node resources to the UE 100*b*. The information may be advertised to both UEs and relay nodes via broadcast messaging, or separately to, for example, the relay node 111. The UE 100*a* connected to the donor cell 101 via the relay node 111, may also receive a communication 131, such as a RACH-config message, including indications of the resources available for use by the UE 100*a* or the resources reserved for relay node use.

Figure 9:
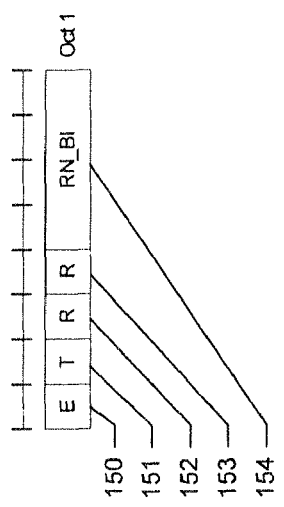
FIG. 9 illustrates an example message subheader for implementing a relay node shorter backoff delay access priority scheme according to various example embodiments of the present invention.

In another access priority scheme, a shorter backoff period may be implemented by a relay node relative to the backoff period implemented by a UE. In this regard, in the event that a relay node fails the RA procedure, the donor cell may indicate a shorter backoff period in the RAR message for a relay node than for a UE. As a result, the relay node may continue the RA preamble retransmission earlier than a UE. To implement this access priority scheme, a new MAC subheader to indicate the backoff value dedicated for relay nodes as depicted in FIG. 9 may be provided, where an RN_BI field indicates a value indicating the duration, or a value that may used to determine the duration, for a relay node backoff period or delay. If the MAC PDU for RAR includes the RARs for both UEs and RNs, the MAC header as depicted in FIG. 9 may follow, and possibly immediately follow, the standard BI MAC subheader. For example, a BI_RN subheader may be defined such that the BI_RN is inserted at the position of the second subheader in the MAC header depicted in FIG. 3*d*. In accordance with various example embodiments, the second backoff indicator subheader, as indicated by a count of the subheaders having a type field indicating that the current subheader is a backoff indicator subheader, may be used for relay node backoff delays. Otherwise if the MAC PDU for RAR only includes the RARs for only RNs, the MAC header as depicted in FIG. 9 may be the first subheader included within the MAC PDU header. As such, in accordance with some example embodiments, the position within the MAC header may used to identify of the RN_BI subheader. For example, the RN_BI subheader may be the last subheader or the last subheader having a type field indicating that the subheader is a BI subheader.

Additionally, or alternatively, the content of the sub-header may identify the subheader as the BI_RN subheader. FIG. 9 depicts the format of the BI_RN subheader. While the BI_RN subheader of FIG. 9 is depicted as being octet aligned, example embodiments of the present invention are contemplated where the BI_RN subheader is not octet aligned. The BI_RN subheader includes five fields. The E field 150 may be an extension field flag that indicates whether or not another subheader follows the current subheader. The T field 151 may be a type field flag that indicates whether the current MAC subheader includes a RAPID or a BI. The R fields 152 and 153 may be reserved fields that may be set to constant values. However, in some example embodiments, one or both of the R fields 152 and 153 may be used to uniquely identify the BI_RN subheader from the BI subheader for UEs. For example, the T field 151 may indicate that the current subheader is a backoff subheader and, for example, the R field 152 may indicate whether the subheader is for relay nodes or UEs. Further, the RN_BI field 154 may include a value indicative of, or a value that may be used to determine, the duration of a backoff delay or period to be implemented after a failure to successfully receive a RAR.

Figure 10:
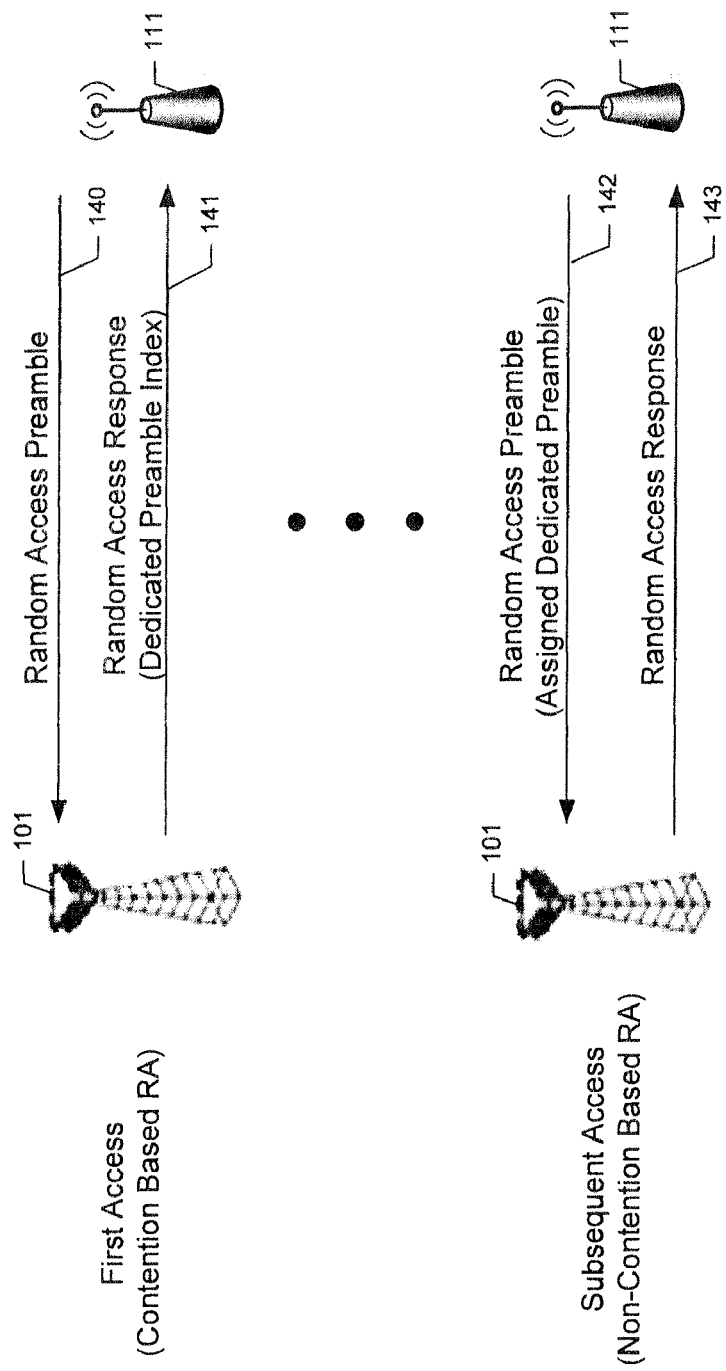
FIG. 10 illustrates an example relay system employing a relay node assigned preamble access priority scheme according to various example embodiments of the present invention.

In yet another access priority scheme, relay nodes may utilize preambles assigned to the relay nodes by the donor cells. In this regard, a relay node may implement a contention based RA procedure for a first or original access. A first or original access may occur when, for example, the relay node is newly deployed, when the relay node detects a superior donor cell and establishes a backhaul link with the superior donor cell, or when the relay node is moving and thereby losing a previous connection. A first access in this regard is depicted in FIG. 10, where a random access preamble is used at 140 in a contention based RA procedure. In response, the donor cell 101 may assign and provide a dedicated preamble to the relay node 111 at 141. In subsequent accesses, the relay node 111 may use the non-contention based RA procedure in the event that any further traffic needs to be forwarded. At 142, the relay node 111 accesses the donor cell 101 using the assigned and dedicated random access preamble in accordance with non-contention based RA. In response, the donor cell 101 may provide an RA response message at 143.

In some example embodiments, a timer may be used to ensure the validity of the assigned and dedicated preamble. The timer can be assigned to relay node by donor cell together with the dedicated preamble in 141, or be included in the system information. In the event that a donor cell detects no access using an assigned preamble from the associated relay node until after the timer expires, the preamble may be considered invalid, and the relay node may discard the preamble. Accordingly, the relay node may need to perform another contention based RA procedure to get a new dedicated preamble.

As an alternative to assigning preambles via non-contention based RA, the preambles may be assigned in a more static manner. For example, during configuration (e.g., during initial power on procedure) a preamble may be assigned and the preamble may be utilized, possibly indefinitely or until reconfiguration is needed. As result of this alternative, signaling to assign the preamble may be reduced or minimized.

Another priority access scheme may involve a relay node higher power preamble transmission. In an example embodiment where the relay node is mobile, the initial transmit power for an RA preamble may be defined as being higher than the transmit power currently defined for preamble transmission. Following the normal preamble transmission, the relay node may increase the power of preamble transmissions, and could potentially end up with a transmit power higher than the currently defined highest possibility for UEs. In an example embodiment involving a stationary relay node, the relay node preamble transmission power may be defined such that the relay node uses a current setting for the transmission power, or a transmission power used at a last access attempt. In some example embodiments, the transmission power used at the last attempt may be used as a starting power level for the next access. These approaches may be defined such that the received power level from the relay node preamble is higher than any potential preamble sent by a UE.

In yet another priority access scheme, resources may again be allocated to the relay nodes. However, the resources may be a variety of resources that may not be involved in an RA procedure. For example, once a relay node obtains a valid timing advance, which could be accomplished via a RA procedure, the timing advance would be valid, as long as the relay node is stationary and the donor cell is stationary. Accordingly, the relay node may be pre-allocated UL resources for connection establishment attempts (e.g., requesting further resources from the donor cell). In this regard, a scheduling request (SR) on the PUCCH may be used or pre-allocated UL resources on the Packet Uplink Shared Channel (PUSCH) may be utilized.

Use of an SR on the PUCCH may involve the relay node being allocated with dedicated PUCCH resources. The relay node may potentially use the resources only for sending the SR, but the resources may also be used for Channel Quality Indicator (CQI) transmission for by the donor cell for further resource allocation. The PUCCH resources may be shared among a number of relay nodes, but need not be shared with UEs to limit interference.

Use of pre-allocated UL resources on the PUSCH may be implemented in a number of ways. For example, the relay node may be allocated specific UL resources. In this regard, the resources may be allocated similar to the manner in which Semi-Persistent Scheduling (SPS) is implemented. Further, the UL resources may be shared among several relay nodes. A relay node may use the UL resource for transmission of a Buffer Status Report (BSR), a Status Report (SR), an RA preamble, or the like. If the resource allocation is shared among several relay nodes, then the content transmitted may be formatted such that the donor cell can distinguish the received data, even if more than one relay node is transmitting by combining this technique with RA preamble transmission. In an example embodiment, where the resources are not shared, the relay node may be free to send any type of data.

Further, the UL resources may be scheduled via Packet Downlink Control Channel (PDCCH) and a given C-RNTI, which may be monitored by the relay node as needed. Combined with preamble transmission, potentially dedicated per relay node, a robust solution is realized and competition with UE RA procedure attempts by UEs on the shared PRACH may be avoided. In this regard, according to some example embodiments, preambles would not be required to be reserved for the relay nodes.

The forgoing describes a plurality of mechanisms by which priority may be provided to a relay node. While the priority access schemes are presented separately, one of skill in the art would appreciate that combinations of the various schemes may be implemented to provide priority to a relay node.

Figure 11:
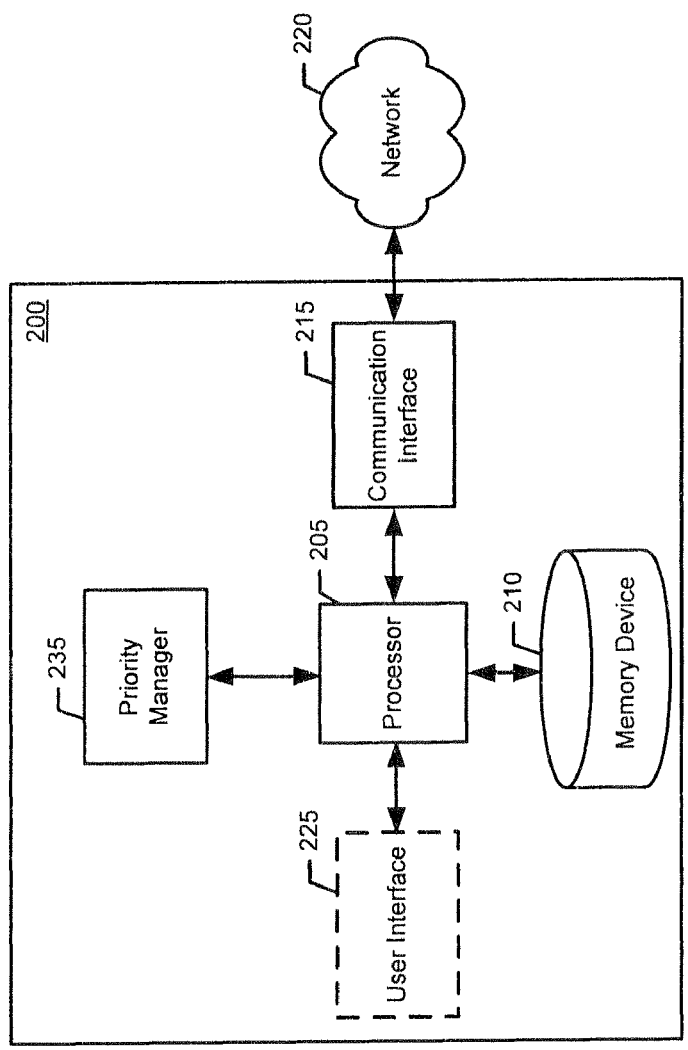
FIG. 11 illustrates a block diagram of an example apparatus for providing relay node priority according to various example embodiments of the present invention.

The description provided above and generally herein illustrates example methods, example apparatuses, and example computer program products for generating, transmitting, and responding to access messaging involving communications systems with a relay node. FIG. 11 illustrates an example embodiment of the present invention in the form of an example apparatus 200 that is configured to perform various aspects of the present invention as described herein. The example apparatus 200 may also be configured to perform example methods of the present invention, such as those described with respect to FIGS. 13 and/or 14. In this regard, the apparatus 200 may be configured to operate as a relay node and/or a user device (e.g., a UE). Accordingly, apparatus 200 may be configured to operate only as a relay node, only as a user device, or both as a user device and a relay node given particular circumstances.

Referring now to FIG. 11, in some example embodiments, the apparatus 200 may, be embodied as, or included as a component of, a communications device with wired or wireless communications capabilities. In some example embodiments, the apparatus 200 may include or be included within communications device, such as a stationary or mobile access point or a mobile terminal such as a mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. Regardless of the type of communications device, apparatus 200 may also include computing capabilities.

The example apparatus 200 includes or is otherwise be in communication with a processor 205, a memory device 210, a communications interface 215, and a priority manager 235. In some embodiments, the example apparatus 200 may optionally include, for example, when the apparatus 200 is embodied as a user device, a user interface 225. The processor 205 may be embodied as various means implementing various functionality of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein. Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a mobile terminal) configured for employing example embodiments of the present invention by further configuration of the processor 205 via executed instructions for performing the algorithms and operations described herein.

The memory device 210 may be one or more tangible, non-transitory, computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The communication interface 215 may be any device or means embodied in either hardware, a computer program product, or a combination of hardware and a computer program product that is configured to receive and/or transmit data from/to a network and/or any other device or module in communication with the example apparatus 200. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including a processor for enabling communications with network 220. Via the communication interface 215 and the network 220, the example apparatus 200 may communicate with various other network entities in a device-to-device fashion and/or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UT- RAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 215 may also be configured to support communications at the network layer, possibly via Internet Protocol (IP).

The user interface 225 may be in communication with the processor 205 to receive user input via the user interface 225 and/or to present output to a user as, for example, audible, visual, mechanical or other output indications. The user interface 225 may include, for example, a keyboard, a mouse, a joystick, a display (e.g., a touch screen display), a microphone, a speaker, or other input/output mechanisms. According to various example embodiments, the user interface 225 may include hardware and/or software to support the operation of an image capturing device, such as a camera module. The image capturing device may be configured to capture images that may be acted upon in accordance with example embodiments of the present invention.

The priority manager 235 of example apparatus 200 may be any means or device embodied, partially or wholly, in hardware, a computer program product, or a combination of hardware and a computer program product, such as processor 205 implementing stored instructions to configure the example apparatus 200, or a hardware configured processor 205, that is configured to carry out the functions of the priority manager 235 as described herein. In an example embodiment, the processor 205 includes, or controls, the priority manager 235. The priority manager 235 may be, partially or wholly, embodied as processors similar to, but separate from processor 205. In this regard, the priority manager 235 may be in communication with the processor 205. In various example embodiments, the priority manager 235 may, partially or wholly, reside on differing apparatuses such that some or all of the functionality of the priority manager 235 may be performed by a first apparatus, and the remainder of the functionality of the priority manager 235 may be performed by one or more other apparatuses.

When operating as a relay node, the apparatus 200 and the processor 205 may be configured to perform the following functionality via the priority manager 235. In this regard, the priority manager 235 may be configured to generate a relay node access message. The relay node access message may be for initiating an access procedure to establish a connection between a relay node and a donor cell. The relay node access message may be generated in accordance with an access priority scheme. The access priority scheme may be defined to allocate a higher priority to the relay node access message than a user device access message for initiating the access procedure to establish a direct connection between the user device and the donor cell.

In accordance with various example embodiments, priority manager 235 may implement one or more access priority schemes. One access priority scheme may involve the priority manager 235 being configured to select a preamble from a group of preambles dedicated for relay node access. In this regard, a collection of preambles may include a group of preambles dedicated for use by relay nodes and another group of preambles for non-relay node use, such as use by user devices to directly connect to the donor cell. As such, the group of preambles dedicated for relay node access may be unavailable for use by non-relay node devices, such as user devices. Further, the priority manager 235 may be configured to generate the relay node access message with the selected preamble dedicated for use by relay nodes.

In accordance with another example embodiment, priority manager 235 may be configured to implement an access priority scheme that involves the use of dedicated resources reserved for transmission of relay node access messages. The dedicated resources may be used for relay node access messaging, to the exclusion of non-relaying node device (e.g., user device) access messaging.

In accordance with another example embodiment, priority manager 235 may be configured to implement an access priority scheme that involves a relay node using a shorter backoff delay. The backoff delay may be triggered in response to a messaging collision or when a responding message is expected, but not received within a predetermined time threshold. In this regard, a relay node backoff period may be shorter than a user device backoff period. The shorter backoff period may be implemented prior to providing for transmission of the relay node access message.

In accordance with another example embodiment, priority manager 235 may be configured to implement an access priority scheme based on a relay node assigned preamble scheme. In this regard, the priority manager 235 may be configured to generate the relay node access message with a preamble selected from a group of predefined preambles stored at the relay node (e.g., in memory device 210), when the relay node access message is an original relay node access message. In this regard, an original relay node access message may be an initial message sent to a particular donor cell. Generating the relay node access message with a preamble selected from a group of predefined preambles stored at the relay node may also be performed when a dedicated preamble provided by the donor cell at an earlier time has expired. Further, the priority manager 235 may be configured to generate the relay node access message with the dedicated preamble provided by the donor cell when the preamble provided by the donor cell has not yet expired.

In accordance with yet another example embodiment, priority manager 235 may be configured to implement a relay node higher powered preamble transmission scheme. In this regard, priority manager 235 may cause the apparatus 200, for example via the communications interface, to transmit the relay node access message at a higher transmission power than user device access messages.

As described above and generally herein, some or all of the various access priority schemes may be combined to generate additional access priority schemes. Further, regardless of the access priority scheme that may be implemented, priority manager 235 may also be configured to provide for transmission of the relay node access message in accordance with the access priority scheme.

Additionally, or alternatively, the apparatus 200 may operate as a user device (e.g., UE). When operating as a user device, the apparatus 200 and the processor 205 may be configured to perform the following functionality via the priority manager 235. In this regard, the priority manager 235 may be configured to generate a user device access message. The user device access message may be for initiating an access procedure to establish a connection between a user device and a donor cell. The user device access message may be generated in accordance with an access priority scheme. The access priority scheme may be defined to allocate a lower priority to the user device access message than a relay node access message for initiating the access procedure to establish a connection between relay node and the donor cell.

In accordance with various example embodiments, the priority manager 235 may implement one or more access priority schemes from the perspective of a user device attempting to access a donor cell directly. In accordance with one example embodiment, the priority manager 235 may be configured to select a preamble from a group of preambles dedicated for user device access. In this regard, a collection of preambles may include group of preambles dedicated for use by relay nodes and another group of preambles for non-relay node use, such as use by user devices to directly connect to the donor cell. The priority manager 235 may therefore be configured to select a preamble from the group of preambles available for non-relay node use. Further, the example method may include generating the user device access message with the selected preamble.

In accordance with another example embodiment, priority manager 235 may be configured to implement an access priority scheme that involves the use of dedicated resources reserved for transmission of relay node access messages. The dedicated resources may be used for relay node access messaging, to the exclusion of user device access messaging. As such, the priority manager 235 may be configured to cause the apparatus 200 to transmit a user device access message on resources other than those dedicated for relay node use.

In accordance with another example embodiment, priority manager 235 may be configured to implement an access priority scheme that involves a relay node using a longer backoff delay for a user device. The backoff delay may be triggered in response to a messaging collision or when a responding message is expected but not received within a predetermined time threshold. In this regard, a user device backoff period may be longer than a relay node backoff period. The longer backoff period for the user device may be implemented prior to providing for transmission of the user device access message.

In accordance with another example embodiment, priority manager 235 may be configured to implement a relay node assigned preamble scheme. In this regard, priority manager 235 may be configured to implement contention-based accessing or a non-contention based accessing device throughout some or all communications sessions with a donor cell, while a rely node may originally operate via contention-based accessing, and then subsequently operate via non-contention-based accessing.

In accordance with yet another example embodiment, priority manager 235 may be configured to implement a relay node higher powered preamble transmission scheme. In this regard, priority manager 235 may provide for transmission of the user device access message at a lower transmission power than a relay node access message.

As described above and generally herein, some or all of the various access priority schemes may be combined to generate additional access priority schemes. Further, regardless of the access priority scheme that may be implemented, priority manager 235 may also be configured to provide for transmission of the user device access message in accordance with the access priority scheme.

Figure 12:
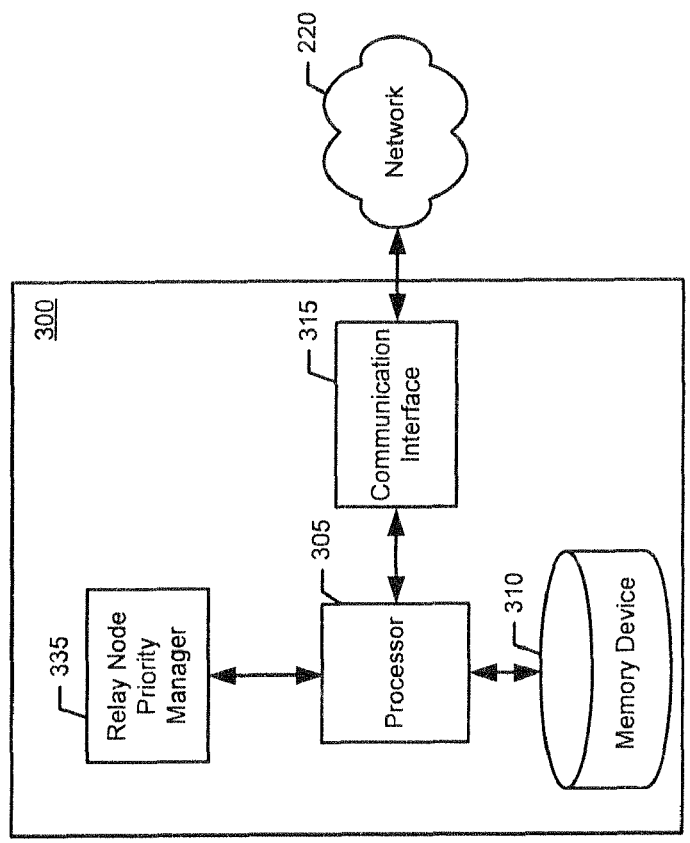
FIG. 12 illustrates a block diagram of another example apparatus for providing relay node priority according to various example embodiments of the present invention.

FIG. 12 illustrates an example embodiment of the present invention in the form of an example apparatus 300 that is configured to perform various aspects of the present invention as described herein. The example apparatus 300 may also be configured to perform example methods of the present invention, such as those described with respect to FIG. 15. In this regard, the apparatus 300 may be configured to operate as a donor cell.

The apparatus 300 may, be embodied as, or included as a component of, a communications device with wired or wireless communications capabilities. In some example embodiments, the apparatus 300 may include or be included within communications device, such as a stationary or mobile access point (e.g. eNB), or a mobile terminal such as a mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. Regardless of the type of communications device, apparatus 300 may also include computing capabilities.

The example apparatus 300 includes or is otherwise in communication with a processor 305, a memory device 310, a communications interface 315, and a relay node priority manager 335. The processor 305 may be embodied as various means implementing various functionality of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 305 may be representative of a plurality of processors, or one or more multiple core processors, operating in concert. Further, the processor 305 may be comprised of a plurality of transistors, logic gates, a clock (e.g., oscillator), and the like to facilitate performance of the functionality described herein. The processor 305 may, but need not, include one or more accompanying digital signal processors. In some example embodiments, the processor 305 is configured to execute instructions stored in the memory device 310 or instructions otherwise accessible to the processor 305. The processor 305 may be configured to operate such that the processor causes the apparatus 300 to perform various functionalities described herein. Whether configured as hardware or via instructions stored on a computer-readable storage medium, or by a combination thereof, the processor 305 may be an entity capable of performing operations according to embodiments of the present invention while configured accordingly. Thus, in example embodiments where the processor 305 is embodied as an ASIC, FPGA, or the like, the processor 305 is specifically configured hardware for conducting the operations described herein. Alternatively, in example embodiments where the processor 305 is embodied as an executor of instructions stored on a computer-readable storage medium, the instructions specifically configure the processor 305 to perform the algorithms and operations described herein. In some example embodiments, the processor 305 is a processor of a specific device (e.g., a mobile terminal) configured for employing example embodiments of the present invention by further configuration of the processor 305 via executed instructions for performing the algorithms and operations described herein.

The memory device 310 may be one or more tangible, non-transitory computer-readable storage media that may include volatile and/or non-volatile memory. In some example embodiments, the memory device 310 includes Random Access Memory (RAM) including dynamic and/or static RAM, on-chip or off-chip cache memory, and/or the like. Further, memory device 310 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 310 may include a cache area for temporary storage of data. In this regard, some or all of memory device 310 may be included within the processor 305.

Further, the memory device 310 may be configured to store information, data, applications, computer-readable program code instructions, or the like for enabling the processor 305 and the example apparatus 300 to carry out various functions in accordance with example embodiments of the present invention described herein. For example, the memory device 310 could be configured to buffer input data for processing by the processor 305. Additionally, or alternatively, the memory device 310 may be configured to store instructions for execution by the processor 305.

The communication interface 315 may be any device or means embodied in either hardware, a computer program product, or a combination of hardware and a computer program product that is configured to receive and/or transmit data from/to a network and/or any other device or module in communication with the example apparatus 300. Processor 305 may also be configured to facilitate communications via the communications interface by, for example, controlling hardware included within the communications interface 315. In this regard, the communication interface 315 may include, for example, one or more antennas, a transmitter, a receiver, a transceiver and/or supporting hardware, including a processor for enabling communications with network 220. Via the communication interface 315 and the network 220, the example apparatus 300 may communicate with various other network entities in a device-to-device fashion and/or via indirect communications via a base station, access point, server, gateway, router, or the like.

The communications interface 315 may be configured to provide for communications in accordance with any wired or wireless communication standard. The communications interface 315 may be configured to support communications in multiple antenna environments, such as multiple input multiple output (MIMO) environments. Further, the communications interface 315 may be configured to support orthogonal frequency division multiplexed (OFDM) signaling. In some example embodiments, the communications interface 315 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 315 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 315 may also be configured to support communications at the network layer, possibly via Internet Protocol (IP).

The relay node priority manager 335 of example apparatus 300 may be any means or device embodied, partially or wholly, in hardware, a computer program product, or a combination of hardware and a computer program product, such as processor 305 implementing stored instructions to configure the example apparatus 300, or a hardware configured processor 305, that is configured to carry out the functions of the relay node priority manager 335 as described herein. In an example embodiment, the processor 305 includes, or controls, the relay node priority manager 335. The relay node priority manager 335 may be, partially or wholly, embodied as processors similar to, but separate from processor 305. In this regard, the relay node priority manager 335 may be in communication with the processor 305. In various example embodiments, the relay node priority manager 335 may, partially or wholly, reside on differing apparatuses such that some or all of the functionality of the relay node priority manager 335 may be performed by a first apparatus, and the remainder of the functionality of the relay node priority manager 335 may be performed by one or more other apparatuses.

When operating as a relay node, the apparatus 300 and the processor 305 may be configured to perform the following functionality via the relay node priority manager 335. In this regard, the relay node priority manager 335 may be configured to receive an access message for initiating an access procedure to establish a connection to a donor cell. The relay node priority manager 335 may be further configured to determine, based on an access priority scheme, that the access message is an access message generated by a relay node in accordance with the access priority scheme. The access priority scheme may be defined to allocate a higher priority to a relay node access message or actions taken in response to a relay node access message than a user device access message or actions taken in response to a user device access message.

In accordance with various example embodiments, relay node priority manager 335 may be configured to implement one or more access priority schemes. One example access priority scheme may involve dedicated relay node preambles. In this regard, relay node priority manager 335 may be configured to identify the preamble of the access message as one of one or more preambles dedicated for use by relay nodes, and respond to the access message, identified as a relay node access message, with heightened priority relative to the response to a non-relay node access message (e.g., a user device access message).

In accordance with another example embodiment, relay node priority manager 335 may be configured to implement an access priority scheme that involves the use of dedicated resources reserved for transmission of relay node access messages. The dedicated resources may be used for relay node access messaging, to the exclusion of user device access messaging. Accordingly, the relay node priority manager 335 may be configured to receive, or cause the apparatus 300 to receive, the access message via resources dedicated for use by relay nodes, and identify the access message as a relay node access message based on the resources by which the access message was received.

In accordance with another example embodiment, relay node priority manager 335 may be configured to implement an access priority scheme that involves a relay node using a shorter backoff delay than a user device. In this regard, the relay node priority manager 335 may be configured to send an access message response to a relay node indicating a value that provides a relatively shorter backoff period for relay nodes. On the other hand, the relay node priority manager 335 may be configured to send an access message response to a user device indicating a value that provides a relatively longer backoff period for user devices.

In accordance with another example embodiment, relay node priority manager 335 may be configured to implement a relay node assigned preamble scheme. In this regard, the relay node priority manager 335 may be configured to receive, or cause the apparatus 300 to receive, an original relay node access message including a preamble selected by the relay node from a group of preambles. The relay node priority manager 335 may be configured to, in response to receiving the original access message, assign a new dedicated preamble to the relay node for subsequent use. In some example embodiments, the relay node priority manager 335 may also be configured to implement a timer to determine when the assigned, dedicated preamble expires. A preamble may expire if the timer reaches a threshold duration from which the preamble was assigned, or a threshold time from the last time the preamble was used in a communication. Upon expiration of a preamble, the relay node priority manager 335 may be configured to provide a notification regarding the expired preamble and/or await a new, original relay node access message.

In accordance with yet another example embodiment, relay node priority manager 335 may be configured to implement a relay node higher powered preamble transmission scheme. In this regard, relay node priority manager 335 may be configured to determine a power level of an access message transmission. If the power of the access message transmission exceeds a predefined threshold, then the access message may be identified as a relay node access message.

Regardless of the access priority scheme implemented by the relay node priority manager 335, the relay node priority manager 335 may also be configured to prioritize establishment of a connection between a relay node and a donor cell, in response to determining that the access message is a relay access message. In this regard, actions taken with respect to the relay node access message may be prioritized ahead of actions taken with respect to a user device access message. As described above and generally herein, some or all of the various access priority schemes may be combined to generate additional access priority schemes.

Figure 13:
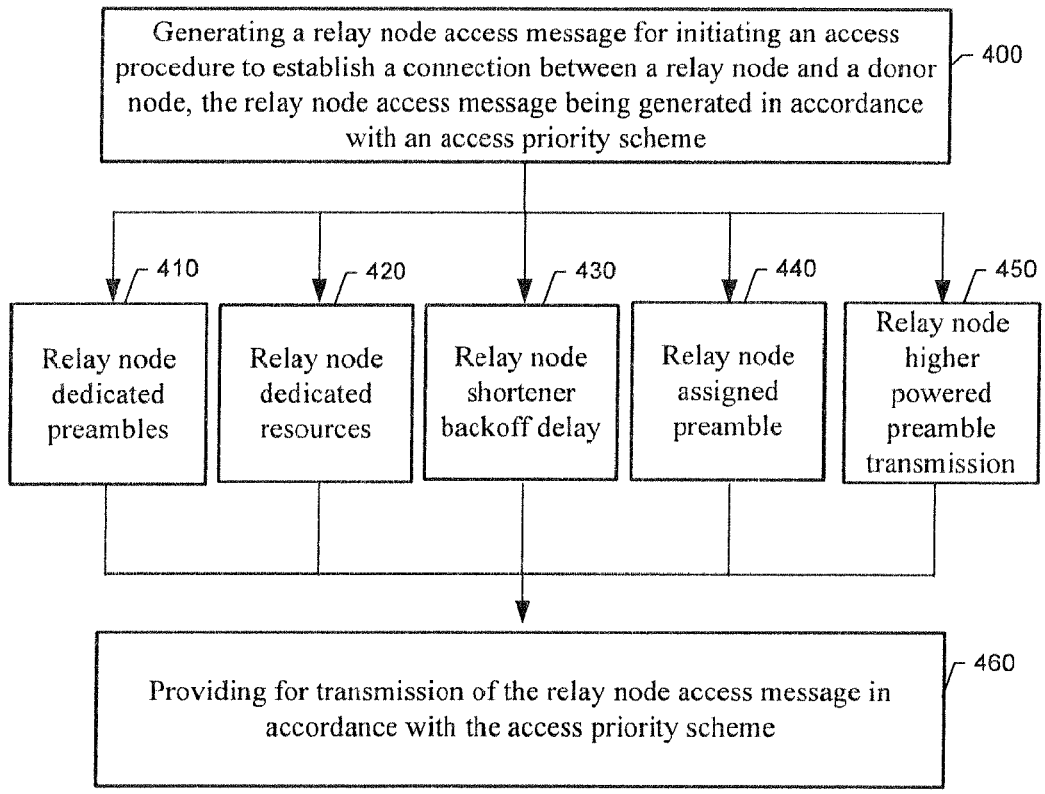
FIG. 13 illustrates an example method for providing relay node priority according to various example embodiments of the present invention.
Figure 14:
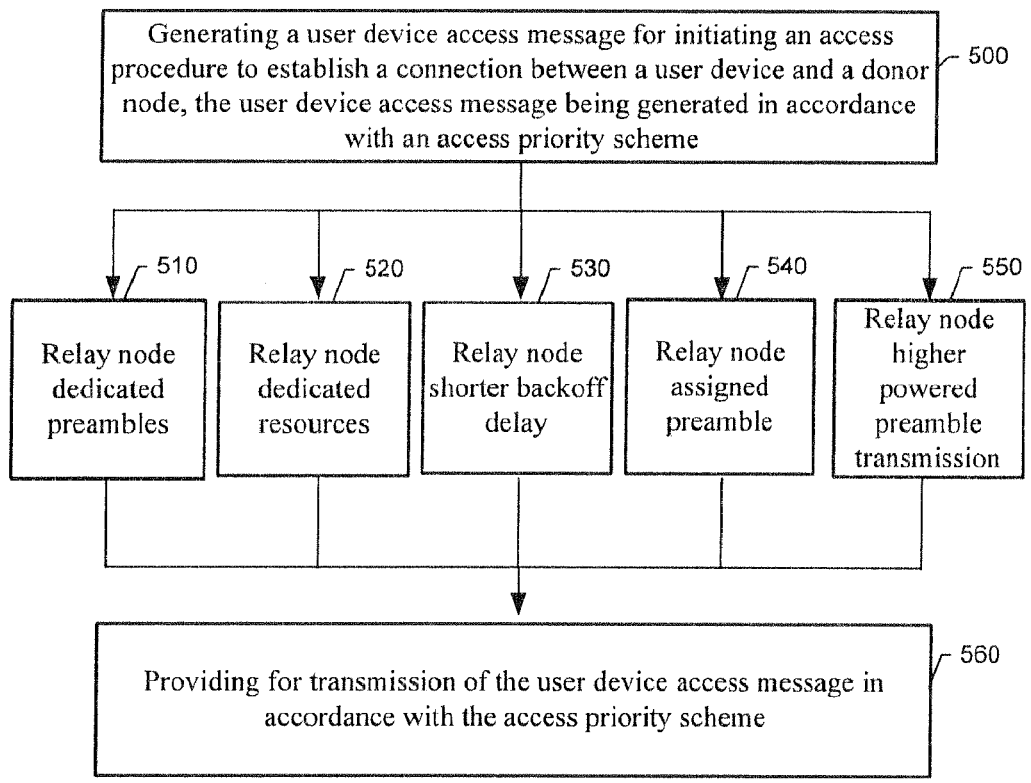
FIG. 14 illustrates another example method for providing relay node priority according to various example embodiments of the present invention.
Figure 15:
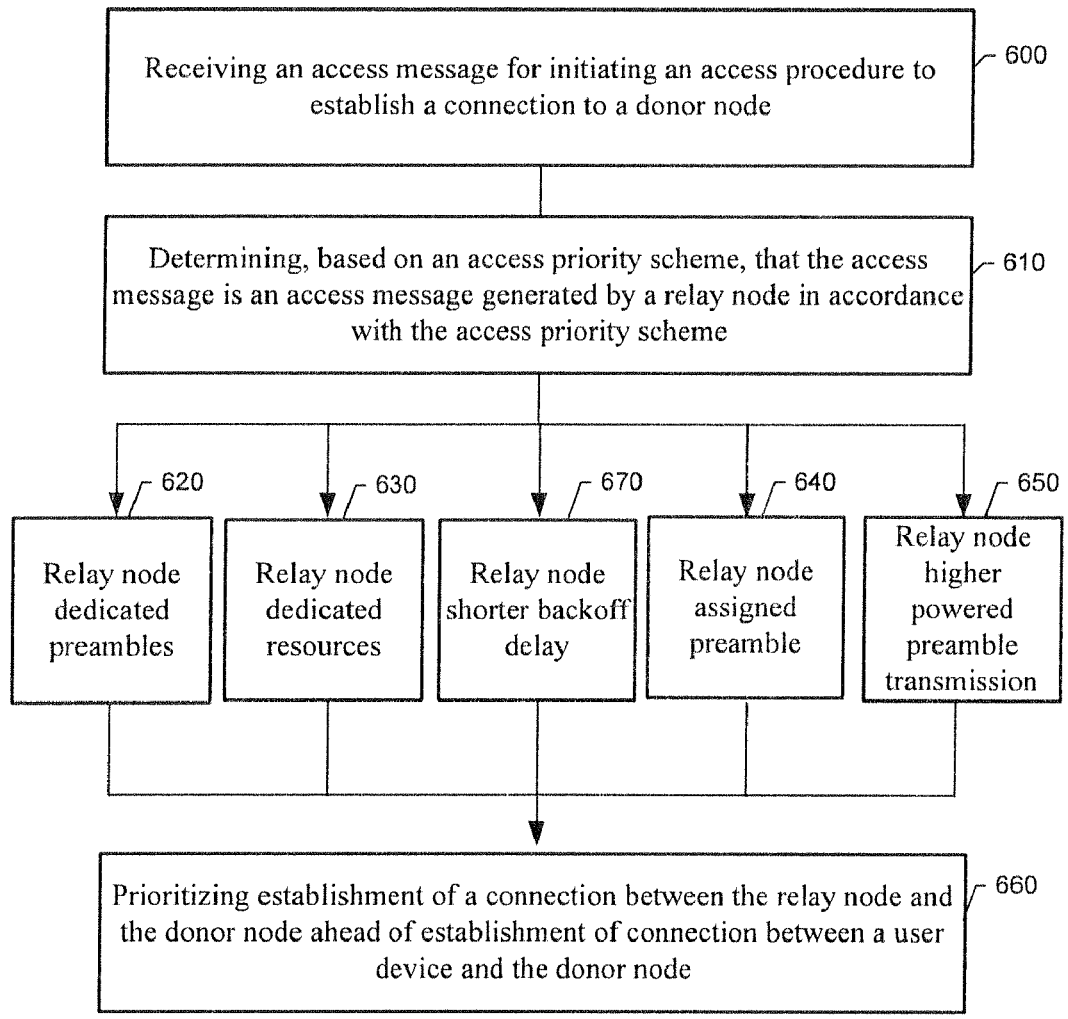
FIG. 15 illustrates yet another example method for providing relay node priority according to various example embodiments of the present invention.

FIGS. 13, 14, and 15 illustrate flowcharts of example systems, methods, and/or computer program products according to example embodiments of the invention. It will be understood that each block or operation of the flowcharts, and/or combinations of blocks or operations in the flowcharts, can be implemented by various means. Means for implementing the blocks or operations of the flowcharts, combinations of the blocks or operations in the flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as memory devices 210 or 310, of an example apparatus, such as example apparatus 200 or 300, and executed by a processor, such as the processor 205 or 305. As will be appreciated, any such program code instructions may be loaded onto a computer or other programmable apparatus (e.g., processor 205, memory device 210, processor 305, memory device 310) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowchart by a processor, or storage of instructions associated with the blocks or operations of the flowcharts in a computer-readable storage medium, support combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

FIG. 13 depicts one or more flowcharts of example methods for connecting to a relay node from the perspective of an apparatus operating as a relay node. In this regard, at 400 an example method includes generating a relay node access message. The relay node access message may be for initiating an access procedure to establish a connection between a relay node and a donor cell. The relay node access message may be generated in accordance with an access priority scheme. The access priority scheme may be defined to allocate a higher priority to the relay node access message than a user device access message for initiating the access procedure to establish a direct connection between the user device and the donor cell.

In accordance with various example embodiments, an example method may implement one or more access priority schemes. One access priority scheme at 410 may involve selecting a preamble from a group of preambles dedicated for relay node access. In this regard, a collection of preambles may include a group of preambles dedicated for use by relay nodes and another group of preambles for non-relay node use, such as use by user devices to directly connect to the donor cell. As such, the group of preambles dedicated for relay node access may be unavailable for use by non-relay node devices, such as user devices. Further, the example method may include generating the relay node access message with the selected preamble dedicated for use by relay nodes.

In accordance with another example embodiment, an example method may implement, at 420, an access priority scheme that involves the use of dedicated resources reserved for transmission of relay node access messages. The dedicated resources may be used for relay node access messaging, to the exclusion of user device access messaging.

In accordance with another example embodiment, an example method may implement, at 430, an access priority scheme that involves a relay node using a shorter backoff period (or backoff delay). The backoff period may be triggered in response to a messaging collision or when a responding message is expected, but not received within a predetermined time threshold. A value indicating the duration of the backoff period may be received via a response from the donor cell. In this regard, a relay node backoff period may be shorter than a user device backoff period. The shorter backoff period may be implemented prior to providing for transmission of the relay node access message at 460.

In accordance with another example embodiment, an example method may implement, at 440, a relay node assigned preamble scheme. In this regard, the example method may include generating the relay node access message with a preamble selected from a group of predefined preambles stored at the relay node, when the relay node access message is an original relay node access message. An original relay node access message may be an initial message sent to a particular donor cell. Generating the relay node access message with a preamble selected from a group of predefined preambles may also be performed when a dedicated preamble provided by the donor cell at an earlier time has expired. Further, the example method may include generating the relay node access message with the dedicated preamble provided by the donor cell when the preamble provided by the donor cell has not yet expired.

In accordance with yet another example embodiment, an example method may implement, at 450, a relay node higher powered preamble transmission scheme. In this regard, transmission of the relay node access message may be provided for at a higher transmission power than a user device access message.

As described above and generally herein, some or all of the various access priority schemes indicated in 410-450 may be combined to generate additional access priority schemes. Further, regardless of the access priority scheme that may be implemented, an example method may also include providing for transmission of the relay node access message in accordance with the access priority scheme at 460.

FIG. 14 depicts one or more flowcharts of example methods for establishing a connection between a user device (e.g., a UE) and a donor cell from the perspective of an apparatus operating as a user device. In this regard, at 500 an example method includes generating a user device access message. The user device access message may be for initiating an access procedure to establish a connection between a user device and a donor cell. The device access message may be generated in accordance with an access priority scheme. The access priority scheme may be defined to allocate a lower priority to the user device access message than a relay node access message for initiating the access procedure to establish a connection between relay node and the donor cell.

In accordance with various example embodiments, an example method may implement one or more access priority schemes. One access priority scheme at 510 may involve selecting a preamble from a group of preambles dedicated for user device access. In this regard, a collection of preambles may include a group of preambles dedicated for use by relay nodes, and another group of preambles for non-relay node use, such as use by user devices to directly connect to the donor cell. The example method may therefore include selecting a preamble from the group of preambles available for non-relay node use. Further, the example method may include generating the user device access message with the selected preamble.

In accordance with another example embodiment, an example method may implement, at 520, an access priority scheme that involves the use of dedicated resources reserved for transmission of relay node access messages. The dedicated resources may be used for relay node access messaging, to the exclusion of user device access messaging. As such, the example method may include transmitting a user device access message on resources other than those dedicated for relay node use.

In accordance with another example embodiment, an example method may implement, at 530, an access priority scheme that involves a relay node using a longer backoff delay for a user device. The backoff delay may be triggered in response to a messaging collision or when a responding message is expected but not received within a predetermined time threshold. A value indicating the duration of the backoff period may be received via a response from the donor cell. In this regard, a user device backoff period may be longer than a relay node backoff period. The longer backoff period for the user device may be implemented prior to providing for transmission of the user device access message at 560.

In accordance with another example embodiment, an example method may implement, at 540, a relay node assigned preamble scheme. In this regard, the example method may include a user device remaining as a contention-based accessing device or a non-contention based accessing device throughout some or all communications sessions, while a relay node may originally operate via contention-based accessing, and then subsequently operate via non-contention-based accessing.

In accordance with yet another example embodiment, an example method may implement, at 550, a relay node higher powered preamble transmission scheme. In this regard, transmission of the user device access message may be provided for at a lower transmission power than a relay node access message.

As described above and generally herein, some or all of the various access priority schemes indicated in 510-550 may be combined to generate additional access priority schemes. Further, regardless of the access priority scheme that may be implemented, an example method may also include providing for transmission of the user device access message in accordance with the access priority scheme at 560.

FIG. 15 depicts one or more flowcharts of example methods for connecting to a relay node from the perspective of an apparatus operating as a donor cell. In this regard, at 600 an example method includes receiving an access message for initiating an access procedure to establish a connection to a donor cell. At 610, the example method includes determining, based on an access priority scheme, that the access message is an access message generated by a relay node in accordance with the access priority scheme. The access priority scheme may be defined to allocate a higher priority to a relay node access message or actions taken in response to a relay node access message than a user device access message or actions taken in response to a user device access message.

In accordance with various example embodiments, an example method may implement one or more access priority schemes. One access priority scheme at 620 may involve dedicated relay node preambles. In this regard, the example method may include identifying the preamble of the access message as one of one or more preambles dedicated for use by relay nodes, and responding to the access message, identified as a relay node access message, with heightened priority, relative to the response to a non-relay node access message (e.g., a user device access message).

In accordance with another example embodiment, an example method may implement, at 630, an access priority scheme that involves the use of dedicated resources reserved for transmission of relay node access messages. The dedicated resources may be used for relay node access messaging, to the exclusion of user device access messaging. Accordingly, the example method may include receiving the access message via resources dedicated for use by relay nodes, and identifying the access message as a relay node access message based on the resources by which the access message was received.

In accordance with another example embodiment, an example method may implement, at 670, an access priority scheme that involves a relay node using a shorter backoff delay than a user device. In this regard, the example method may include sending an access message response to a relay node indicating a value that provides a relatively shorter backoff period for relay nodes. On the other hand, the example method may also include sending an access message response to a user device indicating a value that provides a relatively longer backoff period for user devices.

In accordance with another example embodiment, an example method may implement, at 640, a relay node assigned preamble scheme. In this regard, the example method may include receiving an original relay node access message including a preamble selected by the relay node from a group of preambles. The example method may include, in response to receiving the original access message, assigning a new dedicated preamble to the relay node for subsequent use. In some example embodiments, the example method may also implement a timer to determine when the assigned, dedicated preamble expires. A preamble may expire if the timer reaches a threshold duration from which the preamble was assigned or a threshold time from the last time the preamble was used. If a preamble expires, the method may include providing a notification regarding the expired preamble and awaiting a new, original relay node access message.

In accordance with yet another example embodiment, an example method may implement, at 650, a relay node higher powered preamble transmission scheme. In this regard, the example method may include determining a power level of an access message transmission. If the power of the access message transmission exceeds a predefined threshold, than the access message may be identified as a relay node access message.

At 660, the example method may include prioritizing establishment of a connection between a relay node and a donor cell, in response to determining that the access message is a relay access message. In this regard, actions taken with respect to the relay node access message may be prioritized ahead of actions taken with respect to a user device access message. As described above and generally herein, some or all of the various access priority schemes indicated in 620, 630, 670, 640, and 650 may be combined to generate additional access priority schemes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus, comprising:
  at least one processor and at least one memory including computer program code, the at least one memory and the computer program code configured to, with the at least one processor, cause the apparatus at least to:
  generate a relay node access message for initiating a random access procedure to establish a connection between a relay node and a base station, the relay node access message being generated in accordance with an access priority scheme, the access priority scheme being defined such that a higher priority is allocated to the relay node access message than a user device access message for initiating another random access procedure to establish another connection between the user device and the base station; and
  transmit the relay node access message in accordance with the access priority scheme.

2. The apparatus of claim 1, wherein the apparatus is further configured to at least:
  select a preamble from a group of preambles dedicated for relay node access, wherein a collection of preambles includes the group of preambles dedicated for use by relay nodes and another group of preambles for non-relay nodes; and
  include the selected preamble in the relay node access message.

3. The apparatus of claim 1, wherein the apparatus is further configured to at least transmit the relay node access message using dedicated resources reserved for transmission of relay node access messages to the exclusion of user device access messaging.

4. The apparatus of claim 1, wherein the apparatus is further configured to at least transmit the relay node access message using a relay node backoff period, wherein a value indicating a duration of the relay node backoff period is received via a response from the base station, the duration of the relay node backoff period being shorter than a duration of a user device backoff period.

5. The apparatus of claim 1, wherein the apparatus is further configured to at least generate the relay node access message with a preamble selected from a group of predefined preambles stored at the relay node.

6. The apparatus of claim 5, wherein the apparatus is further configured to at least generate the relay node access message with the preamble selected from the group of predefined preambles, the preamble selected from the group of predefined preambles being used to generate the relay node access message subsequent to the expiration of a dedicated preamble provided by the base station.

7. The apparatus of claim 1, wherein the apparatus is further configured to at least transmit the relay node access message at a transmission power that is higher than a transmission power of a user device access message.

8. An apparatus, comprising:
   at least one processor and at least one memory including computer program code, the at least one memory and the computer program code configured to, with the at least one processor, cause the apparatus at least to:
   generate a user device access message for initiating a random access procedure to establish a connection between a user device and a base station, the user device access message being generated in accordance with an access priority scheme, the access priority scheme being defined such that a lower priority is allocated to the user device access message for than a relay node access message for initiating another random access procedure to establish another connection between the relay node and the base station; and
   transmit the user device access message in accordance with the access priority scheme.

9. The apparatus of claim 8, wherein the apparatus is further configured to at least
   select a preamble from a group of preambles dedicated for user device access, wherein a collection of preambles includes the group of preambles dedicated for use by user devices and another group of preambles for relay nodes; and
   include the selected preamble in the user device access message.

10. The apparatus of claim 8, wherein the apparatus is further configured to at least transmit the user device access message using resources other than resources reserved for transmission of relay node access messages.

11. The apparatus of claim 8, wherein the apparatus is further configured to at least transmit the user device access message using a user device backoff period, wherein a value indicating a duration of the user device backoff period is received via a response from the base station, the duration of the user device backoff period being longer than a duration of a relay node backoff period.

12. The apparatus of claim 8, wherein the apparatus is further configured to at least transmit the user device access message at a transmission power that is lower than a transmission power of a relay node access message.

13. The apparatus of claim 8, wherein the apparatus comprises a user device.

14. An apparatus, comprising:
   at least one processor and at least one memory including computer program code, the at least one memory and the computer program code configured to, with the at least one processor, cause the apparatus at least to:
   receive an access message for initiating a random access procedure to establish a connection to a base station;
   determine that the access message is a relay node access message generated by a relay node; and
   prioritize an action executed for establishing a connection between the relay node and the base station, wherein the prioritized action is in accordance with an access priority scheme and in response to at least determining that the access message is the relay node access message, wherein the action executed for establishing the connection between the relay node and the base station is prioritized ahead of another action executed with respect to a user device access message.

15. The apparatus of claim 14, wherein the apparatus is further configured to at least determine that a preamble of the access message is one of one or more preambles dedicated for use by relay nodes.

16. The apparatus of claim 14, wherein the apparatus is further configured to at least determine that the access message was received via resources dedicated for use by relay nodes.

17. The apparatus of claim 14, wherein the apparatus is further configured to at least cause an access message response to be sent to the relay node indicating a value that provides a shorter backoff period to the relay node than a backoff period provided to a user device.

18. The apparatus of claim 14, wherein the apparatus is further configured to at least determine that the access message is an original relay node access message that includes a preamble selected by the relay node from a group of preambles; and
   assign a dedicated preamble to the relay node, in response to receiving the original relay node access message, for subsequent use by the relay node.

19. The apparatus of claim 18, wherein the apparatus is further configured to at least implement a timer to determine when the assigned, dedicated preamble expires, wherein the assigned, dedicated preamble expires when the timer reaches a threshold duration from which the assigned, dedicated preamble was assigned or when the timer reaches a threshold duration from the last time the assigned, dedicated preamble was used.

20. The apparatus of claim 14, wherein the apparatus is further configured to at least determine that the access message is the relay node access message generated by the relay node by determining that a power level of a transmission of the access message exceeds a predefined threshold.

* * * * *